United States Patent

Bruglemans

[15] 3,660,604

[45] May 2, 1972

[54] METERING SYSTEM FOR TANDEM SWITCHED CALLS

[72] Inventor: Lucas Bruglemans, Antwerp, Belgium

[73] Assignee: GTE Automatic Electric Laboratories Incorporated, Northlake, Ill.

[22] Filed: June 5, 1970

[21] Appl. No.: 43,886

[52] U.S. Cl. ....................179/8 A
[51] Int. Cl. ....................H04m 15/26
[58] Field of Search ....................179/8 A, 8 R

[56] References Cited

UNITED STATES PATENTS 2,882,340 4/1959 Murray ....................179/8 A

*Primary Examiner*—Kathleen H. Claffy
*Assistant Examiner*—Thomas J. D'Amico
*Attorney*—Cyril A. Krenzer, K. Mullerheim and B. E. Franz

[57] ABSTRACT

A crosspoint switching exchange includes a metering scheme for selectively metering traffic through trunk circuits used to access a plurality of exchanges via a tandem exchange. The trunk circuit includes a pair of contact sets, one set operated during the interval of pulling up the crosspoint matrix path to the trunk circuit and the other set operated by the path hold relay. These contacts respectively operate and hold a metering relay in the metering equipment which then has only to scan this relay to determine the total usage for a particular exchange via this trunk group of circuits.

4 Claims, 2 Drawing Figures

INVENTOR
LUCAS BRUGLEMANS
BY
Bernard E. Franz
ATTORNEY

METERING SYSTEM FOR TANDEM SWITCHED CALLS

BACKGROUND OF THE INVENTION

1. Field of the Invention

This invention relates to a metering arrangement for a crosspoint type telephone switching system to record the trunk usage therein, and more particularly to an arrangement which permits the metering only when the call is destined for a particular location.

2. Description of the Prior Art

The following described patents disclose crosspoint switching systems within which the present invention is incorporated. They are hereby incorporated by reference and may be referred to for detailed explanations of the associated apparatus.

A U.S. patent for a Communication Switching System by M. H. Esperseth, F. B. Sikorski, K. K. Spellnes, and W. R. Wedmore, U.S. Pat. No. 3,275,752, covers a crosspoint switching network comprising switching stages in tandem, with each stage comprising a plurality of crosspoint matrices with a relay at each crosspoint of each stage, and with the operate or pull windings of successive stages connected in series, each relay has a diode connected in series with its pull winding to prevent sneak paths involving more than one relay per stage. Operate potentials are applied to a selected pair of terminals, one at each end of a given plurality of stages of the network, to operate the relays in a series path through the pull windings of one relay in each stage to establish a connection. In the embodiment disclosed, the operate path includes three stages in series. The stages are arranged so that between any two terminals on opposite sides of the given plurality of stages through which the operate path extends there is a unique path. Each crosspoint relay also has a second winding in series with a normally open set of its own contacts and the stages are also serially connected so that after the relays in the selected path have been operated, a hold extends in series through the second winding and series contacts of the relays in the path. Cutoff or hold relays in the terminating units may also be connected in series in the hold path.

According to U.S. Pat. No. 3,324,249 to E. Cotroneo and L. Bruglemans, a switching network of the type disclosed in U.S. Pat. No. 3,275,752 is provided with the additional inclusion in each interstage link of a busy relay having its winding connected in series with the hold winding, and has a normally closed contact set connected in series with the operating path. Thus, each link which is busy has its busy relay operated to open the operate path. Therefore, when a path including a busy link is scanned, the open contacts in the operate path will block the test path so that the path will not be selected. The terminating unit between the scanner and the adjacent stage of the network also includes a busy relay which operates to open the operate path between the scanner and the network and thereby prevent selection of this path.

Further in an application of this system, the trunk terminals are included in the pull path. This inclusion is via the winding of a relay in the trunk circuit. This relay is therefore operated during the interval used by the marker to operate the crosspoint relays. Contacts of this relay are utilized by the common control equipment via the marker highway MH to load various items of data into the trunk circuit. This data is of pertinence for the duration of the call, and may be relative to the types of time and zone metering, or class of call that is to be using the trunk circuit.

Scanning type metering systems of current types are disclosed in U.S. Pat. Nos. 3,433,898 and 3,106,613. The systems of both of the above patents are arranged to scan the lines of a subscriber for the presence of metering pulses, the totals of the pulses so accumulated are then used for an accounting of the charges for the use of the equipment. However, this equipment does not readily lend itself to occasional use for traffic measurement purposes, since it requires a comparatively large amount of dedicated equipment, especially in the portion of the memory that must be reserved.

Further where the traffic must be selectively metered at an originating terminal exchange having only a single group of outgoing trunks TR, then this group of trunks carries all of the traffic to exchanges II, III, and IV. In this case exchange B serves as a tandem switching point for calls to exchanges III and IV. This means that the trunk group TR carries a mixed traffic and therefore a straight occupational metering of the trunks would not disci exchanges II, III, and IV as shown in FIG. 1.

A patent disclosing equipment for measuring trunk traffic via a tandem exchange is disclosed in the U.S. Pat. No. 2,875,286. As there disclosed, special line equipment is used to monitor the digits dialed via a particular trunk circuit. This line equipment accesses a register which records the numbers dialed after which other common equipment is activated to register the quantity of calls made to a particular dialed number. As is obvious the equipment is rather complicated and as a consequence expensive, further it is arranged to duplicate functions which are normally performed by the common equipment of common controlled crosspoint exchanges.

SUMMARY OF THE INVENTION

According to the invention, an arrangement for forwarding a metering instruction to the trunk circuit is provided in a crosspoint switching system of the type where during a first operation of the marker, an operating or pull potential is applied to an end terminal of the crosspoint network via trunk circuit. The forwarding of the metering instruction is accomplished by including in the trunk circuit a contact set that is operated simultaneously with the matrix pull operation, if one is present, from the marker to a particular terminal of the trunk circuit. This metering mark is selectively applied by the marker in accordance with the information for completing the call and also the requirement for metering as received from the central processor of the common control equipment. A second mark is applied to this same terminal of the trunk circuit by a relay in the trunk that is operated for the purpose of holding the operated network connection.

Simplified metering equipment then has only to be connected to this terminal of the trunk circuit to register the occurrence of this first mark or potential relayed from the marker indicative of the fact that the call being completed is for a particular exchange, and then to register the duration of the second mark to determine the occupancy of the trunk for the call to this exchange.

DESCRIPTION OF THE DRAWING

This invention and the manner of practicing it will become more apparent, by reference to the following description of an embodiment of the invention taken in conjunction with the accompanying drawing, wherein.

DESCRIPTION OF THE PREFERRED EMBODIMENT

Figures 1, 2:
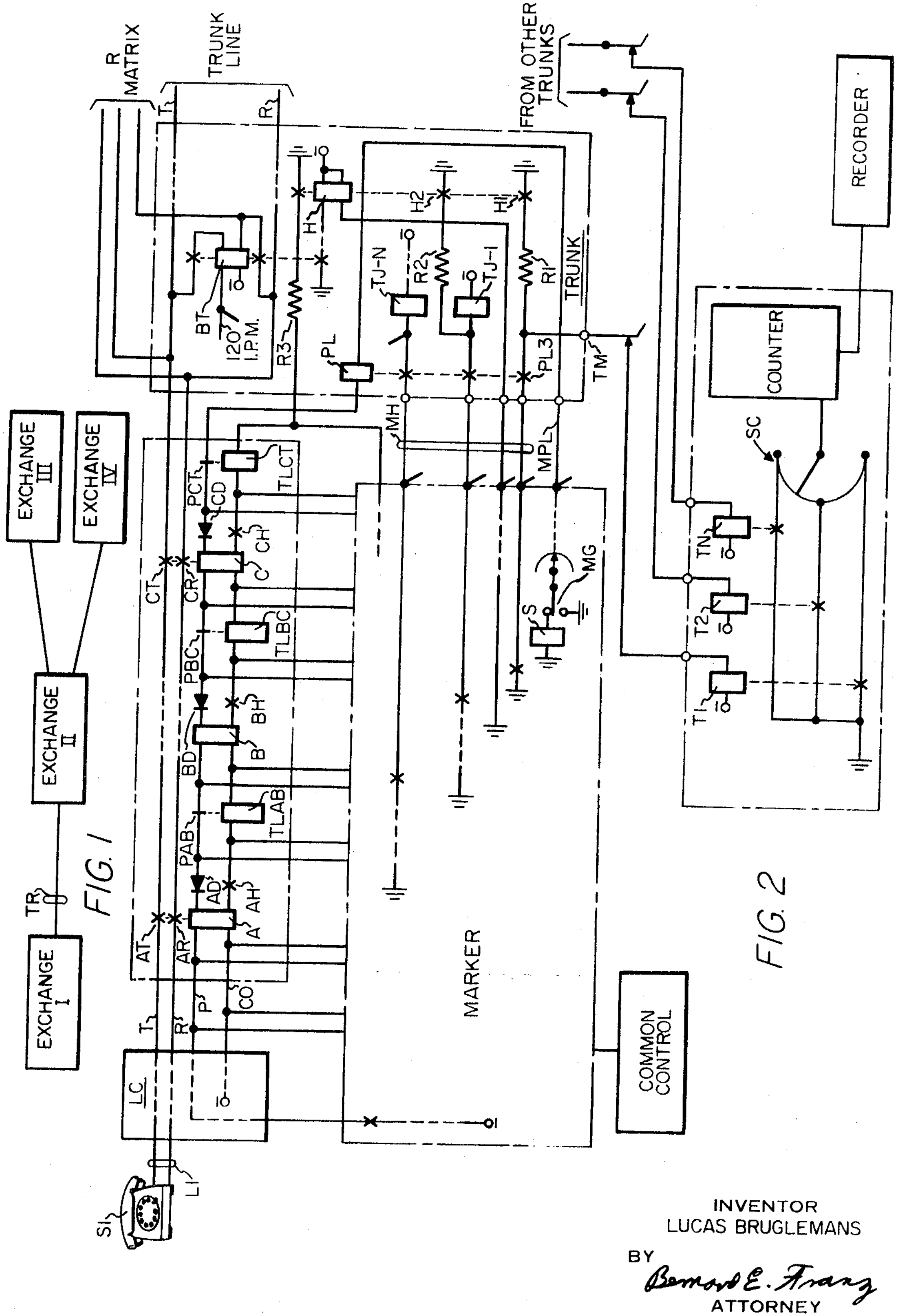
FIG. 1 is a single line block diagram of a communication switching network within which the present metering system may be applied.
FIG. 2 is a simplified diagram of a switching network of an exchange with the metering system of the invention incorporated therein.

FIG. 2 of the drawing discloses one of an obvious plurality of subscriber stations S1 connected via a pair of conductors to a line circuit LC, of the exchange. The line circuit may be of the conventional type such as disclosed in application Ser. No. 751,865 of Lucas Bruglemans.

The line circuit is connected to the side A of the switching matrix by the line conductors T and R, the matrix pull conductor P and the matrix hold conductor CO. The matrix is shown with only a single crosspoint assembly for each of the three stages A, B and C. Each crosspoint includes a pair of windings, a first winding to operate the contacts associated with this crosspoint, and a second or hold winding to maintain the contacts in the operated position. The contacts consist of the make contacts for extending the conductors T and R and a single make contact for extending the hold conductor CO. A diode AD, BD or CD is associated with the pull winding of each of the crosspoints A, B and C. The hold conductor in addition to passing through the hold winding and the associated contacts of each crosspoint in a connection also passes through a winding of a link relay TLAB, TLBC and TLCT in each of the interstage links AB, BC and C trunk. The functions of these relays in the links are explained in detail in U.S. Pat. No. 3,324,249 to E. Cotroneo and L. Bruglemans. Briefly, this relay functions to open the pull path of the crosspoints in a busy link after which the marker has only to mark the inlet at the side A of the matrix and scan the pull leads at the other end of the switching network in order to find an available path as explained in the above referenced patent. This scanning by the marker for this mark is performed through the trunk circuits. The pull leads interrupted by the pull interrupt relays TLAB in the link AB, TLBC in the link BC and TLCT between the stage C and the trunk maintain the pull leads open if the corresponding links are busy. Therefore, as described in the above patent if the pull interrupt relays are unoperated the pull path is complete and the marker finds the mark signal, it means that the path is completely idle and available. The marker will then disconnect its sensing devices and connect a ground potential MG to reserve the path. Application of the ground potential MG will operate relay PL in the selected trunk via lead MPL, relay PL, contacts PCT, diode CD, coil of crosspoint C, contacts PBC, diode BD, coil of crosspoint B, contacts PAB, diode AD, coil of crosspoint A and pull lead P through the line circuit LC to battery potential in the marker. Since the marker only executes one path selection and marking at a time with a switching network and associated trunk group, there is only one trunk at a time in which a relay PL is operated, and the relay PL is only operated during the pull function of the marker.

Based on this particular operation of the marker, that only one relay PL can be operated at a time, the marker utilizes a common marker data highway MH to transfer particular instructions to the trunk circuit. Immediately after a trunk instruction has been transferred from the marker to a trunk the operated relays, for example, TJ–1 through TJ–N, in the trunk latch as, for example, relay TJ–1 from the resistance R2 ground from contacts H2, such that they remain operated after relay PL in the trunk releases. When the marker is instructed by the central processor of the common control to establish the connection to a particular trunk of a group of trunks, it may also receive a trunk instruction specifying that the traffic carried by this trunk is to be measured. The marker selects a path through the matrices and marks it. This marking operates the relay PL in the selected trunk circuit. The marker then applies the trunk instruction to the common highway. Since only one trunk circuit has its relay PL operated, only this particular circuit has its contacts closed to extend the instruction markings to the instruction storage relays such as TJ1 through TJN. The instruction for traffic measurement is also extended to the trunk circuit at this time and it is also extended via the relay PL contacts PL–3 to a TM terminal of the trunk unit.

The metering unit which may be portable for use as required in the various exchanges of the system includes a plurality of relays T1 through TN. These relays are such that they will operate from the direct potential extended to them from contacts PL4, but cannot be operated in series with the resistor R1. Each of these relays has a make contact that is effective upon operation of the relay to extend a ground marking potential to a scanning device. The scanning device is here symbolically illustrated as a rotary switch SC capable of successively scanning each of the positions associated with the respective T1 through TN relays. A counter shown by a block so labeled within the metering unit block is arranged to drive the scanner and if a marking is encountered, cause an appropriate record to be made in the recorder. The scanner, counter and recorder may be of the type disclosed in the U.S. Pat. No. 3,433,890 of H. M. Sellenslagh and W. Van Hoeck issued Mar. 18, 1969, or a simplified version thereof.

Thus when the marker removes the marking potential, relay PL releases, but relay T1 in the metering unit remains operated in series with resistor R1. Relay H is operated at the time that the trunk is seized for the purpose of holding the pulled path.

What is claimed is:

1. In an automatic telephone system having a plurality of interconnected exchanges, including at least one terminal exchange connected via a tandem exchange to other exchanges of the system, each exchange being operative to extend calls between local subscribers and to subscribers of other exchanges, said terminal exchange having a common control and marker controlled switching equipment: a plurality of trunks interconnecting said terminal exchange and said tandem exchange, each of said plurality of trunks terminated in a trunk circuit at said terminal exchange, means in said terminal exchange for metering calls to subscribers of at least one other exchange in response to instructions from said common control via said marker comprising in combination; common metering equipment associated with said trunk circuits and a metering terminal in each said trunk circuit connected to said metering equipment; said trunk circuit having a first contact set operated simultaneously with operation of said local switching equipment by said marker to apply a first potential received from said marker to said metering terminal, a second contact set in said trunk circuit operated to apply a second potential to said metering terminal upon completion of a connection via said trunk circuit, said metering equipment comprising, a relay for each trunk circuit connected to said trunk circuit metering terminal for operation in response to said application of said first potential and held in response to said application of said second potential from said trunk circuit, a cumulative counter and a scanner in said metering equipment for sequentially and periodically accessing said relays, said counter operated to register a count for said respective trunk circuit upon accessing an operated relay.

2. In an automatic telephone system as claimed in claim 1 wherein said trunk circuit includes a series relay through which the pull potential for operating the switching equipment is applied and which operates simultaneously with said switching equipment to operate said first contact set.

3. In an automatic telephone system as claimed in claim 1 wherein said trunk circuit includes a second relay operated after a successful operation of said switching equipment to apply a holding potential to maintain said switching equipment in an operated state and which operatively includes said second contact set.

4. In an automatic telephone system as claimed in claim 1 wherein said metering equipment is portable and may be connected to other trunk groups of other exchanges.

* * * * *